Sept. 2, 1952      M. A. GARBELL      2,609,437
SURFACE MARKING SYSTEM FOR AIRCRAFT RUNWAYS
Filed Feb. 10, 1950
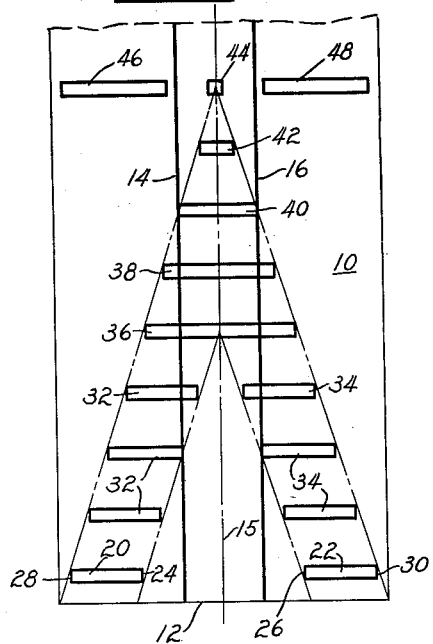
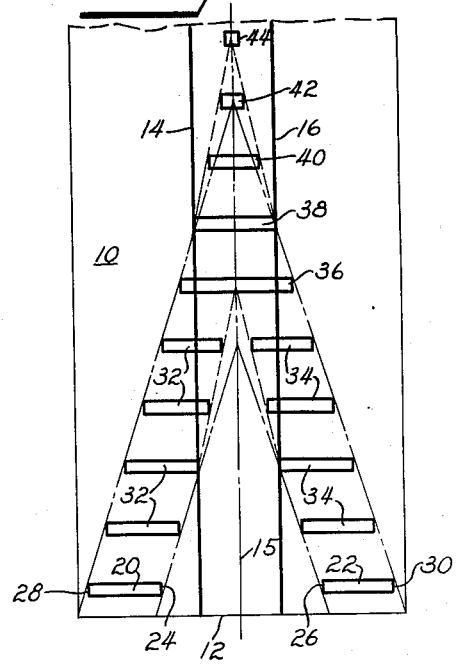
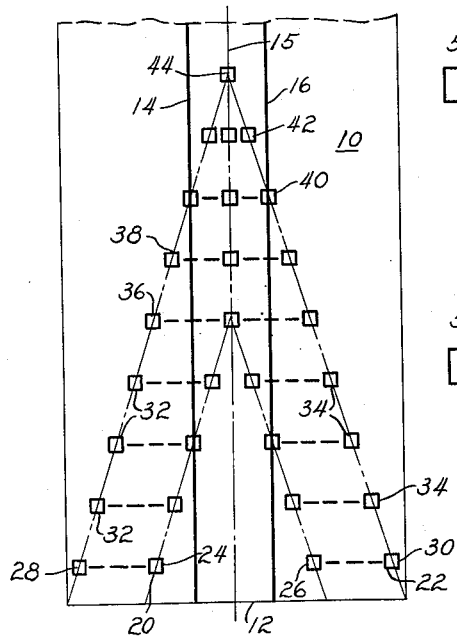
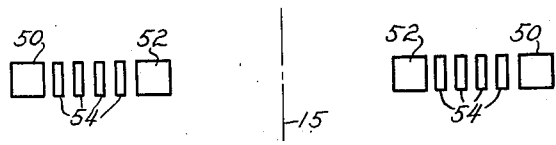
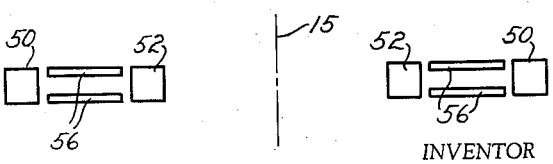
INVENTOR
MAURICE A. GARBELL
BY Scrivener & Parker
ATTORNEYS Patented Sept. 2, 1952

2,609,437

UNITED STATES PATENT OFFICE 2,609,437

SURFACE MARKING SYSTEM FOR AIRCRAFT RUNWAYS

Maurice A. Garbell, San Francisco, Calif.

Application February 10, 1950, Serial No. 143,459

17 Claims. (Cl. 177—352)

This invention relates to surface marking systems for the touchdown and terminal warning zones of aircraft runways, and more particularly to an arrangement of runway surface markings for indicating to the pilot of an aircraft the longitudinal distance to the most desirable touchdown point or any other predetermined point on the runway, as well as to aid him in assessing visually the elevation, transverse position, horizontal direction of motion, and attitude in roll or bank of his aircraft.

The principal object of the present invention is to facilitate the landing of aircraft by providing a new and improved system of surface markings on aircraft runways which is so arranged as to visibly present a change in the configuration or pattern of runway surface markings as the craft approaches and transits past the most desirable touchdown point on the runway so as to clearly indicate the longitudinal distance between the aircraft and the most desirable touchdown point while providing also an indication of the elevation, transverse position, and horizontal direction of motion of the craft, and also a simulated representation of the natural horizon.

A further object is to increase the safety of the take-off operation of aircraft by providing a new and improved system of surface markings on aircraft runways which is so arranged as to visibly present a change in the configuration or pattern of runway surface markings as an aircraft engaged in take-off operation approaches and enters the terminal warning zone near the end of the runway.

A further object is to coordinate the runway surface marking system of the present invention with the system of approach lights and runway-marker lights, and also the twin parallel so-called centerline markings as currently used in certain airports, in order to secure a highly efficient longitudinal guidance together with guidance with regard to elevation, transverse position, horizontal direction, and roll or bank of aircraft engaged in landing and take-off operations without disturbing the existing airport lighting and surface-marking facilities.

The above stated and other objects and novel features of the invention will appear more fully hereinafter from the following detailed description when taken in connection with the accompanying drawing, which illustrates several forms of the invention. It is to be expressly understood, however, that the drawing is utilized for purposes of illustration only and is not designed as a definition of the limits of the invention, reference being had for this latter purpose to the appended claims.

In the drawing, wherein similar reference characters refer to similar parts throughout the several views:

Fig. 1 is a diagrammatic plan view of a surface marking system for aircraft runways arranged in accordance with the present invention, and Figs. 2, 3, 4 and 5 are diagrammatic plan views of examples of modified forms of the invention.

Referring more particularly to Fig. 1, the runway surface marking system of the present invention is therein illustrated in connection with an aircraft runway 10 having a threshold 12 and equipped with markings comprising two parallel longitudinal stripes 14 and 16 marked on the runway surface symmetrically with respect to the ideal centerline 15 of the runway, each of which may consist of one or more individual lines characterized by a color, brightness, or reflectivity contrasting with that of the major part of the remaining runway surface, and each of which is arranged so as to be clearly visible to the pilot of an aircraft engaged in landing or take-off operation. The invention is applicable to single, twin, or multiple longitudinal stripes or any equivalent fundamentally longitudinal runway surface marking pattern, as will be clearly understood from the following.

Relative to the problem of the landing of aircraft, especially in conditions of restricted meteorological visibility, the essence of the invention is to provide a changing pattern or configuration of markings on the runway surface as the craft approaches the touchdown point on the runway, in order to indicate to the pilot of the aircraft at any point of his visual approach the respective longitudinal distances to one or more predetermined points on the runway, such as the normal touchdown point, for example, or the most distant point on the runway beyond which a touchdown should not normally be made, while simultaneously providing the necessary visual guidance relative to the elevation, transverse position, horizontal direction of motion, and lateral attitude in roll or bank of the craft.

Relative to the problem of the take-off of aircraft, the essence of the invention is to provide a changing pattern or configuration of markings on the runway surface as the craft engaged in a take-off approaches and enters the terminal warning zone at the far end of the take-off runway, that is, that portion of the runway which also serves as the final-approach and touchdown zone for the opposite sense of the runway, in order to indicate to the aircraft pilot that his aircraft has passed its most distant point of safe take-off and is approaching the end of the runway.

This is achieved in the configuration shown in Fig. 1 by providing a plurality of pairs of transverse markings comprising bars or stripes marked on the runway surface in color, brightness, or reflectivity contrasting with that of the major part of the remaining runway surface, which are substantially perpendicular with respect to the aforesaid longitudinal stripes 14 and 16 and which are so associated with said longitudinal stripes 14 and 16 as to secure the aforesaid variation in the appearance of the pattern of surface markings as the aircraft approaches touchdown on the runway 10. More particularly, a pair of aligned transverse bars 20 and 22 are arranged at or adjacent to the runway threshold 12, with their respective inner extremities 24 and 26 located at distances from the ideal runway centerline 15 equal or proportional to the most desirable height at which the approaching aircraft should glide over the runway threshold 12, and with their respective outer extremities 28 and 30 located at distances from the ideal runway centerline 15 equal or proportional to the maximum normally permissible height at which an aircraft can pass over the runway threshold 12 and still make a normal safe landing on the runway 10. Positioned at selected longitudinal distances along the runway 10 from the runway threshold 12, a second, third, and additional pairs of aligned transverse bars 32 and 34 are marked on the surface of runway 10, with their respective inner extremities located at distances from the ideal runway centerline 15 equal or proportional to the most desirable heights at which an aircraft should pass over their respective longitudinal stations on the runway, and their respective outer extremities located at distances from the ideal runway centerline 15 equal or proportional to the maximum normally allowable height at which an aircraft can pass over their respective longitudinal stations on the runway and still accomplish a normal safe landing on runway 10. It will be understood that, inasmuch as the ideal approach glide path and the highest normally allowable approach glide path are substantially parallel with one another, all of the transverse bars 20, 22, 32, and 34, taken individually, will be substantially of the same length. It will be further understood that the pair of transverse bars nearest the ideal touchdown point will be substantially fused into a continuous bar 36, and that the remaining transverse bars 38, 40, and 42 have a progressively shorter overall span, until the last transverse bar 44, preceding the extreme point of allowable touchdown will effectively appear as a dot. It will be understood that the extreme point of allowable touchdown may be marked additionally with a pair of transverse bars 46 and 48 which substantially span the entire width of the runway 10.

From the foregoing it will be readily apparent that owing to the symmetrical but varying arrangement of the pairs of transverse bars 20—22 and 32—34 and of the continuous transverse bars 38, 40, 42, and 44, taken with reference to the parallel longitudinal stripes 14 and 16, a varying pattern of runway surface markings will present itself to the pilot as the aircraft approaches touchdown on the runway 10 in order to signal longitudinal guidance, while the subtended angular magnitude of the transverse bars and the space interjacent between them would provide elevation guidance, and the substantially horizontal alignment of each respective pair of transverse bars, together with its perpendicular intersections with the longitudinal stripes 14 and 16, will provide guidance relative to the transverse position, horizontal direction of motion, and attitude in roll or bank of the aircraft. Preferably, the longitudinal distance between the respective transverse bars is so arranged as to impart preestablished, standardized and generally understood distance information, for example, 100 feet each. The overall dimensions of the complete pattern depend on a number of design criteria, including the overall length of the runway and the most critical type of aircraft which is expected to operate on the runway. For example, in a six-thousand-foot long runway, with longitudinal stripes twenty-five feet apart from one another, the inner extremities 24 and 26 of the transverse bars 20 and 22 located at the runway threshold 12 will be approximately forty feet away from the ideal runway centerline 15, leaving approximately an eighty-foot gap between these bars, and the length of each individual transverse bar 20 or 22 will be approximately fifty feet. The fusion of the pairs of transverse bars into a single, substantially continuous bar 36 will occur near the ideal touchdown point, approximately eight hundred feet from the runway threshold 12. Continuing the reduction in span or length of the subsequent single continuous bars 38, 40, 42, and 44 at the rate of reduction of the maximum allowable heights of the approach glide path at the respective longitudinal runway stations, the extreme normally allowable touchdown point, and hence the location of the dot-like final transverse bar 44, is reached at a longitudinal distance of approximately one thousand eight hundred feet from the runway threshold 12. Thus the pilot, knowing the distances between the pairs of transverse bars, and observing the varying patterns of transverse-bar surface markings resulting from the herein described combination thereof with the longitudinal stripes 14 and 16, as the aircraft approaches touchdown on the runway, may operate the necessary controls of the aircraft and its power plant so as to effect a safe landing on runway 10 or, should the aircraft be unable to touch down before reaching the end of the surface marking system 44—46—48, to effect a safe wave-off and go-around procedure.

In the case of a take-off in the opposite sense on the same runway, the pilot, knowing the distances between the pairs of transverse bars, and observing the varying patterns of transverse-bar surface markings resulting from the herein described combination thereof with the longitudinal stripes 14 and 16, as the accelerating aircraft approaches and enters the terminal warning zone of the runway, may operate the necessary controls of the aircraft, its power plant, or its brakes, respectively, to either effect a safe take-off or a safe full stop before reaching the end 12 of runway 10. It is herein understood that the longest normally allowable touchdown distance from the runway threshold 12 is substantially equal to the distance from the end 12 of the runway 10 of that extreme point at which a full-stop braking run must be initiated.

While Fig. 1 illustrates a system of runway surface markings based on the assumption of ideally straight-line glide paths, it will be readily understood that curved glide paths, or straight glide paths terminating in curved flare-out paths, may be also utilized as the basis of the design of a runway surface marking system laid out as herein specified. For example, Fig. 2 diagrammatically shows an arrangement similar to that of Fig. 1, except that the transverse location of the respective extremities of the transverse bars reflects the curvature of the flare-out portion of the glide path. Here again the surface marking pattern for each respective longitudinal station on the runway, as represented by the respective position of each pair of transverse bars and the longitudinal stripes 14 and 16, will be distinctive and will clearly signal its respective distance from the runway threshold 12, the ideal touchdown point, the extreme normally allowable touchdown point, and, in the opposite sense of the runway, the extreme normally allowable take-off point.

Fig. 3 illustrates a further form of the invention, wherein the individual transverse bars would be constituted by two or more dots or polygons, each marked separately on the runway surface. Herein the transverse bars 36, 38, 40, 42, and 44, located between the ideal touchdown point and the extreme normally allowable touchdown point, would be characterized by having one of their constituent dots or polygons placed substantially coincident with the ideal runway centerline 15.

Figs. 4 and 5 illustrate two typical examples of how transverse bars employed according to the method of the present invention may be laid out with greater continuity than that shown in Fig. 3, and yet with a substantial saving in marking area as compared with the pattern shown in Fig. 1. Fig. 4 shows transverse bars consisting essentially of an outer dot or polygon 50 and an inner dot or polygon 52, wherein the outer and the inner dots or polygons are connected by a shutter-like arrangement of longitudinally disposed short stripes 54. Fig. 5 shows transverse bars consisting essentially of an outer dot or polygon 50 and an inner dot or polygon 52, wherein the outer and the inner dots or polygons are connected by one or more transverse stripes 56.

While it is preferred that all of the transverse bars contained in the pairs 20—22 and 32—34 heretofore described be of substantially the same length and be longitudinally spaced at substantially uniform distance intervals, it will be obvious that, if desired, their respective lengths and longitudinal spacings may be progressively shorter or longer and hence proportional to the distance from a predetermined point on the runway. In this manner, the different lengths and longitudinal spacings of the transverse bars will serve to give additional information as regards the longitudinal distance to the ideal touchdown point on the runway or other selected point on the runway. It will also be evident that the runway threshold 12 herein referred to may be either the physical threshold of the runway surface or overrun surface attached thereto, or the ideal threshold of a portion of the runway surface arbitrarily so defined for operational reasons and purposes.

The term "markings" as used herein means painted areas on the runway, runway inlays composed of a substance having a contrasting color or brightness as compared to the remainder of the runway, runway inlays made of a material that is translucent or transparent and that contain light sources, etc., all of which types of markings are clearly visible to the pilot of an aircraft during landing or take-off and have the additional characteristic of being substantially flush with the surface of the runway, so that they may be employed in those areas of the runway actually used by the aircraft when in contact with the runway.

While several forms of the invention have been illustrated and described herein, it will be readily understood by those skilled in the art that variations or modifications may be resorted to without departing from the spirit of the invention. Reference will therefore be had to the appended claims for a definition of the limits of the invention.

What is claimed is:

1. A surface marking system for an aircraft runway substantially symmetrical with respect to an ideal runway centerline and commencing at a well defined runway threshold, for indicating longitudinal distance to a desirable touchdown point on the runway, comprising a plurality of transverse markings having a span smaller than the width of the runway and being arranged symmetrically with respect to the ideal runway centerline, the first transverse marking being positioned substantially at the runway threshold and the other transverse markings being substantially parallel with said one pair and respectively positioned at longitudinal stations located at different distances from said runway threshold toward said desirable touchdown point, the span of each respective and successive transverse marking being shorter than that of the transverse marking preceding it in substantially direct proportion with the decreasing height of a desirable approach glide path over the respective transverse markings along the runway, and all of said markings being arranged substantially flush with the surface of the runway.

2. A runway surface marking system as set forth in claim 1, wherein the transverse markings are disposed substantially at an angle of ninety degrees with respect to the said runway centerline.

3. The combination of the runway surface marking system set forth in claim 1 with a runway surface marking pattern consisting of one or more longitudinal marking stripes disposed symmetrically with respect to said runway centerline and extending substantially from said runway threshold along a major portion of the length of said runway, said marking stripes being arranged substantially flush with the surface of the runway.

4. The combination of the runway surface marking system set forth in claim 1 with a transverse marking spanning substantially the major part of the width of said runway, positioned substantially coincident with the desired point of touchdown on the said runway.

5. A surface marking system for an aircraft runway substantially symmetrical with respect to an ideal runway centerline and commencing at a well defined runway threshold, for indicating longitudinal distance to a desirable touchdown point on the runway, comprising a plurality of pairs of transverse markings having a transverse gap between the respective inner extremities of the two individual transverse markings constituting each pair smaller than the width of the runway and being arranged symmetrically with respect to the ideal runway centerline, the first pair of transverse markings being positioned substantially at the runway threshold and the other pairs of transverse markings being substantially parallel with said one pair and respectively positioned at longitudinal stations located at different distances from said runway threshold toward said desirable touchdown point, the inner gap of each respective and successive pair of transverse markings being shorter than that of the pair of transverse markings preceding it in substantially direct proportion with the decreasing height of a desirable approach glide path over the respective pairs of transverse markings along the runway, and all of said markings being arranged substantially flush with the surface of the runway.

6. A runway surface marking system as set forth in claim 5, wherein the individual transverse markings of all of said pairs are of substantially equal length.

7. A runway surface marking system as set forth in claim 5, wherein the transverse markings of the said respective pairs are aligned and disposed substantially at an angle of ninety degrees with respect to the said runway centerline.

8. The combination of the runway surface marking system set forth in claim 5 with a runway surface marking pattern consisting of at least one longitudinal marking stripe disposed symmetrically with respect to and on opposite sides of said runway centerline and extending substantially from said runway threshold along a major portion of the length of said runway, said marking stripes being arranged substantially flush with the surface of the runway.

9. A surface marking system for an aircraft runway substantially symmetrical with respect to an ideal runway centerline and commencing at a well defined runway threshold, for indicating longitudinal distance to a desirable touchdown point on the runway, comprising at least one longitudinal marking stripe disposed symmetrically with respect to and on opposite sides of said runway centerline and extending substantially from said runway threshold along a major portion of the length of said runway, each of said longitudinal marking stripes comprising at least one individual longitudinally positioned marking line, and a plurality of pairs of aligned transverse markings consisting of dots and polygons and connecting lines, each individual transverse marking having an inner and an outer extremity, arranged symmetrically with respect to said runway centerline and said longitudinal marking stripes, the transverse markings of one pair being positioned substantially at the runway threshold and extending symmetrically in opposite directions from said ideal runway centerline, and the other pairs of transverse markings being substantially parallel with said one pair and respectively positioned at longitudinal runway stations located at different distances from said runway threshold toward said desirable touchdown point, all of said transverse markings of each respective and successive pair, beginning with said one pair, having the inner extremities thereof positioned at a distance from said ideal runway centerline in substantially direct proportion to the elevation of the most desirable approach glide path at the respective pairs of transverse markings, and having the outer extremities thereof positioned at a distance from said ideal runway centerline in substantially direct proportion to the elevation of the highest allowable ideal approach glide path at the respective pairs of transverse markings, all of said markings and marking stripes being arranged substantially flush with the surface of the runway.

10. A surface marking system for an aircraft runway substantially symmetrical with respect to an ideal runway centerline and terminating at a well defined runway threshold, for indicating longitudinal distance from a desirable take-off point on the runway, comprising a plurality of transverse markings having a span smaller than the width of the runway and being arranged symmetrically with respect to the ideal runway centerline, one transverse marking being positioned substantially at the take-off point and the other transverse markings being substantially parallel with said one transverse marking and respectively positioned at longitudinal stations located at different distances from said take-off point toward said runway threshold, the span of each respective and successive transverse marking being longer than that of the transverse marking preceding it in substantially direct proportion with the increasing height of a desirable take-off climb path over the respective transverse markings along the runway, and all of said markings being arranged substantially flush with the surface of the runway.

11. A runway surface marking system as set forth in claim 10, wherein the transverse markings are disposed substantially at an angle of ninety degrees with respect to said runway centerline.

12. The combination of the runway surface marking system set forth in claim 10, with a runway surface marking pattern consisting of at least one longitudinal marking stripe disposed symmetrically with respect to and on opposite sides of said runway centerline and extending substantially from said take-off point along a major portion of the length of said runway, said marking stripes being arranged substantially flush with the surface of the runway.

13. The combination of the runway surface marking system set forth in claim 10 with a transverse marking spanning substantially the major part of the width of said runway positioned substantially coincident with the take-off point on the runway.

14. A surface marking system for an aircraft runway substantially symmetrical with respect to an ideal runway centerline and terminating at a well defined runway threshold, for indicating longitudinal distance from a desirable take-off point on the runway, comprising a plurality of pairs of transverse markings having a transverse gap between the respective inner extremities of the two individual transverse markings constituting each pair smaller than the width of the runway and being arranged symmetrically with respect to the ideal runway centerline, the first pair of transverse markings being positioned substantially at the take-off point and the other pairs of transverse markings being substantially parallel with said one pair of transverse markings and respectively positioned at longitudinal stations located at different distances from said take-off point toward said rummy threshold, the transverse gap between the respective inner extremities of the two individual transverse markings constituting each respective and successive pair being longer than that of the pair of transverse markings preceding it in substantially direct proportion with the increasing height of a desirable take-off climb path over the respective transverse markings along the runway, and all of said markings being arranged substantially flush with the surface of the runway.

15. A runway surface marking system as set forth in claim 14, wherein the transverse markings of the said respective pairs are aligned and disposed substantially at an angle of ninety degrees with respect to the said runway centerline.

16. The combination of the runway surface marking system set forth in claim 14 with a runway surface marking pattern consisting of at least one longitudinal marking stripe disposed symmetrically with respect to and on opposite sides of said runway centerline and extending substantially from said take-off point along a major portion of the length of said runway, said marking stripes being arranged substantially flush with the surface of the runway.

17. A surface marking system for an aircraft runway substantially symmetrical with respect to an ideal runway centerline and terminating at a well defined runway threshold, for indicating longitudinal distance from a desirable take-off point on the runway, comprising at least one longitudinal marking stripe disposed symmetrically with respect to and on opposite sides of said runway centerline and extending substantially from said runway threshold along a major portion of the length of said runway, each of said longitudinal marking stripes comprising at least one individual longitudinally positioned marking line, and a plurality of pairs of aligned transverse markings consisting of dots and polygons and connecting lines, each individual transverse marking having an inner and an outer extremity, arranged symmetrically with respect to said runway centerline and said longitudinal marking stripes, the transverse markings of one pair being positioned substantially at the take-off point and the other pairs of transverse markings being substantially parallel with said one pair of transverse markings and respectively positioned at longitudinal stations located at different distances from said take-off point toward said runway threshold, all of said transverse markings of each respective and successive pair, beginning with said one pair, having the outer extremities thereof positioned at a distance from said ideal runway centerline in substantially direct proportion to the elevation of the most desirable take-off climb path at the respective pairs of transverse markings, and having the inner extremities thereof positioned at a distance from said ideal runway centerline in substantially direct proportion to the elevation of the lowest allowable take-off climb path at the respective pairs of transverse markings, all of said markings and marking stripes being arranged substantially flush with the surface of the runway.

MAURICE A. GARBELL.

REFERENCES CITED

The following references are of record in the file of this patent:

UNITED STATES PATENTS

| Number | Name | Date |
| --- | --- | --- |
| 2,501,504 | Garbell | Mar. 21, 1950 |

OTHER REFERENCES

Aviation Week, May 31, 1948, pp. 18, 21–25.